United States Patent [19]

Lin et al.

[11] Patent Number: 5,045,396

[45] Date of Patent: Sep. 3, 1991

[54] UV RESISTANT PRIMER

[75] Inventors: Shaow B. Lin, Allison Park; Gary J. Marietti, Cheswick, both of Pa.

[73] Assignee: PPG Industries, Inc., Pittsburgh, Pa.

[21] Appl. No.: 275,494

[22] Filed: Nov. 23, 1988

[51] Int. Cl.$^5$ .............................................. B32B 27/36
[52] U.S. Cl. .................................. 428/412; 428/522; 428/913; 427/54.1
[58] Field of Search ...................... 428/442, 522, 913

[56] References Cited

U.S. PATENT DOCUMENTS

| | | | |
|---|---|---|---|
| 4,275,118 | 6/1981 | Baney et al. | 428/412 |
| 4,299,746 | 11/1981 | Frye | 260/29.2 M |
| 4,390,373 | 6/1983 | White et al. | 106/287.12 |
| 4,395,461 | 7/1983 | Ching | 428/412 |
| 4,405,679 | 9/1983 | Fujioka et al. | 428/216 |
| 4,442,168 | 4/1984 | White et al. | 428/331 |
| 4,477,499 | 10/1984 | Doin et al. | 427/412.1 |
| 4,500,669 | 2/1985 | Ashlock et al. | 524/440 |
| 4,552,936 | 11/1985 | Moore | 525/519 |
| 4,571,365 | 2/1986 | Ashlock et al. | 428/412 |
| 4,615,947 | 10/1986 | Goossens | 428/412 |
| 4,683,169 | 7/1987 | Curry et al. | 428/337 |

FOREIGN PATENT DOCUMENTS 85110293 5/1986 European Pat. Off. .

*Primary Examiner*—P. C. Sluby
*Attorney, Agent, or Firm*—Donna L. Seidel

[57] ABSTRACT

An ultraviolet radiation resistant primer composition is disclosed comprising a hydroxy-containing organic compound such as hydroxybenzophenone or hydroxybenzotriazole in a polymer mixture of alkyl acrylates in an aggressive solvent which promotes adherence of the primer to plastic surfaces such as polycarbonate.

10 Claims, No Drawings

5,045,396

UV RESISTANT PRIMER

CROSS-REFERENCE TO RELATED APPLICATION

The present invention is related to the subject matter of U.S. application Ser. No. 07/276,276 filed on even date herewith by S. B. Lin et al entitled "UV Resistant, Abrasion Resistant Coatings", the disclosure of which is incorporated herein by reference.

FIELD OF THE INVENTION

The present invention relates generally to protective coatings for plastics such as polycarbonate, and more particularly to coatings which protect the underlying substrate from damage caused by exposure to ultraviolet radiation.

BACKGROUND OF THE INVENTION

U.S. Pat. No. 4,275,118 to Baney et al discloses a coating composition comprising an acidic dispersion of colloidal titania, colloidal silica and hydroxylated silsesquioxane in an alcohol-water medium which produces a hard, abrasion-resistant coating when cured on a plastic surface such as polycarbonate.

U.S. Pat. No. 4,299,746 to Frye discloses an improved silicone resin abrasion resistant coating composition prepared by hydrolyzing an alkyltrialkoxysilane in an aqueous colloidal silica dispersion and adding thereto a small amount of an ultraviolet light absorbing compound such as 2,4-dihydroxybenzophenone to the hydrolysis product.

U.S. Pat. Nos. 4,390,373 and 4,442,168 to White et al disclose a cured, transparent, abrasion resistant coating composition comprising an effective abrasion resisting amount of a colloidal dispersion containing colloidal antimony oxide and colloidal silica in a weight ratio of less than or equal to about 30:70 in a water-alcohol solution of the partial condensate of R (Si(OH)$_3$) wherein R is an organic radical.

U.S. Pat. No. 4,395,461 to Ching discloses a method for improving the weatherability of a polycarbonate substrate by initially treating the surface of the polycarbonate substrate with a solution of a hydrolyzed sylated organic UV screen followed by the application of a curable silicone hardcoat composition onto the treated substrate.

U.S. Pat. No. 4,405,679 to Fujioka et al discloses a coated shaped article of a polycarbonate type resin of improved abrasion resistance comprising a shaped polycarbonate substrate, an undercoat applied and cured on the substrate, and an overcoat applied and cured on the undercoat comprising a hydrolyzate of an epoxy-containing silicon compound, at least one member of the group of hydrolyzates of organic silicon compounds, colloidal silica and organic titania compounds, and a curing catalyst.

U.S. Pat. No. 4,477,499 to Doin et al discloses ultraviolet radiation resistant silicone resin coatings having improved thermoformability and shortened required aging achieved by the addition of a Lewis acid compound to the coating composition.

U.S. Pat. Nos. 4,500,669 and 4,571,365 to Ashlock et al disclose transparent, abrasion resistant coating compositions comprising a colloidal dispersion of a water insoluble dispersant in a water-alcohol solution of the partial condensate of silanol wherein the dispersant comprises metals, alloys, salts, oxides and hydroxides thereof.

U.S. Pat. No. 4,552,936 to Moore discloses a protective coating composition containing a polycaprolactone polyol and an aminoplast derivative applied to a thermoplastic substrate to produce a thermoformable article having abrasion resistance, solvent resistance and weatherability.

U.S. Pat. No. 4,615,947 to Goosens describes a primer layer containing a thermoplastic or thermoset acrylic homogeneously admixed with an organopolysiloxane constituent which increases the adhesion of abrasion and solvent resistant organopolysiloxane hardcoats to thermoplastic substrates.

U.S. Pat. No. 4,683,169 to Curry et al discloses methyl methacrylate UV protective coatings for polycarbonate film with improved resistance to microcracking.

European Patent Application No. 851102939 published 05.02.86 entitled "Carbon-Containing Monolithic Glasses Prepared by a Sol-Gel Process" by Baney et al of Dow Corning Corporation discloses an intermediate which comprises a dispersion of a colloidal metal oxide in a water-alcohol solution of the partial condensate of a silanol having the formula RSi(OH)$_3$, wherein the metal oxide is ZrO$_2$, SnO$_2$, ZrSiO$_4$, B$_2$O$_3$ or La$_2$O$_3$.

Optical quality abrasion resistant coated plastic materials generally require a coating that protects the substrate from the damaging effects of ultraviolet (UV) radiation. Protection from ultraviolet radiation is especially important for polycarbonate, since hydrolytic degradation is apparently accelerated by UV exposure. Conventional UV stabilizers do not impart sufficient protective capacity to abrasion resistant coatings, as sufficient amounts of most typical organic UV absorbers cannot be added to water/alcohol based sol-gel type abrasion resistant coating compositions due to limited solubility and further without adversely affecting hardness and adhesion of the coating. Moreover, typical UV absorbers may gradually become deactivated after prolonged exposure, and also may gradually be leached from the composition.

SUMMARY OF THE INVENTION

The present invention provides protection for underlying plastic substrates such as polycarbonate from damaging ultraviolet radiation by means of coating compositions containing ultraviolet absorbing organic compounds, colorless, high efficiency UV absorbers such as hydroxybenzophenone and hydroxybenzotriazole in a polymeric blend of (meth) acrylic copolymers and an aggressive solvent which enhances adhesion of the coating to the substrate.

DESCRIPTION OF THE PREFERRED EMBODIMENT

A thermoplastic acrylic primer is prepared by combining polymethyl methacrylate and polyethyl methacrylate in an aggressive solvent. An organic UV absorber is added to provide the UV protection. A flow control agent is preferably added. The polymethyl methacrylate and polyethyl methacrylate may comprise a blend of homopolymers or may be copolymerized. Preferably, the composition comprises 60 to 90 percent polymethyl methacrylate and 10 to 40 percent polyethyl methacrylate. The weight average molecular weights of the polymers, as measured by gel permeation chromatography is preferably in the range of 80,000 to 350,000.

Clean polycarbonate substrates are preferably dipped in or flow-coated with the primer solution of the present invention, then allowed to air dry for about 15 minutes until tack-free. The primed plastic substrates are then dried for 30 minutes at 60° to 100° C. in an oven.

UV resistant primer that protects substrates such as polycarbonate from degradation caused by ultraviolet is formed by environmentally stable acrylates as the host matrix. Such polymeric acrylates not only provide important bridging adhesion between inorganic based topcoats and polycarbonate, but also are relatively resistant to hot moist environments and UV radiation. Acrylic matrices yielding a glass transition temperature between 65° C. and 105° C. are preferred in accordance with the present invention. The type of (meth)acrylate units, the molecular weight of the polymer(s), and the method of combining, such as blending or copolymerization, are chosen to provide optimum properties.

Equally significant in this invention is the selection of organic ultraviolet absorber(s) which affect both the UV protection efficiency and the moisture sensitivity, resulting from the efficiency of the UV absorber packing into the host acrylic matrix and the molecular compatibility. Poor molecular miscibility and compatibility between the primer matrix and UV absorber is revealed in relatively short retention of the UV absorber during a topcoat application, or otherwise is reflected in poor moisture resistance seen as optical haze, or repelled UV absorber bleaching out after a short period of service.

Preferred acrylic matrices in accordance with the present invention are made by blending 60 to 90 parts of poly(methyl methacrylate) and 40 to 10 parts of poly(ethyl methacrylate), preferably 80 to 90 parts poly(methyl methacrylate) and 10 to 20 parts by weight poly(ethyl methacrylate). Alternatively, copolymers of the corresponding acrylates and their derivatives can also satisfactorily serve as the matrix for UV absorbers in primers of the present invention.

Preferably, benzotriazole types of UV absorbers are chosen for their better compatibility with the hosting acrylic matrix compared with benzophenone type UV absorbers. Preferred compositions of this invention may have various chemical substituents on the hydroxybenzotriale ring, as shown below,

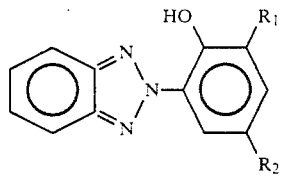

wherein $R_1$ and $R_2$ may be hydrogen, alkyl, aryl and so on. Preferred UV absorbers of the present invention include benzotriazoles of the above type where $R_1$ and $R_2$ are 1,1-dimethylbenzyl phenyl (Tinuvin 900 from Ciba-Geigy), $R_1$ is t-butyl and $R_2$ is propionic ester of polyethylene glycol (Tinuvin 1130 from Ciba-Geigy), and $R_1$ is hydrogen and $R_2$ is octyl phenyl (Cyasorb 5411 from American Cyanamid).

Abrasion resistant coatings that protect plastic substrates such as polycarbonate are formed from sols containing network-forming metal alkoxides such as alkoxysilanes and other metal alkoxides. The alkoxysilane may be an organoalkoxysilane, such as an alkylalkoxysilane or other organofunctional alkoxysilane. The alkoxide may contain alkyl or aryl groups and may be in dimer or higher condensed form so long as hydrolyzable alkoxide groups remain. Hydrolysis and condensation polymerization occur in situ. The resulting composition may be used as a protective overcoat on a substrate or coated substrate. In either case, the coating compositions may be applied by any conventional technique, such as spraying, dipping or flow coating. The composition dries and cures to form a uniform durable coating with good adhesion to plastic substrates such as polycarbonate.

In a preferred embodiment of the present invention, an alkoxide is partially hydrolyzed before adding an ultraviolet absorbing organic compound containing hydrophilic extensions with terminal hydroxyl groups capable of reacting with silanol groups. Preferably, the alkoxide is an alkoxysilane of the general formula $R_xSi(OR')_{4-x}$ wherein R is an organic radical, R' is selected from the group consisting of low molecular weight alkyl radicals, and x is less than 4 and may be zero. The organic radical of R is preferably alkyl, vinyl, methoxyethyl, phenyl, γ-glycidoxypropyl, or γ-methacryloxypropyl. The alkoxide hydrolyzes according to the general reaction

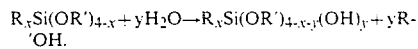

Condensation of the hydrolyzed alkoxide proceeds according to the general reactions

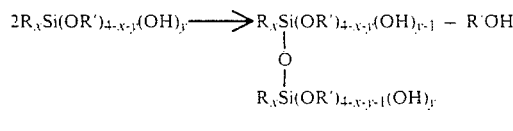

or

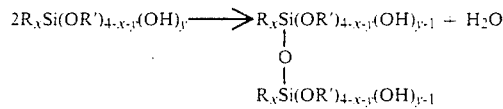

Further hydrolysis and condensation follow. Such abrasion resistant compositions are preferably coated over the primers of the present invention. In order to prevent reaction of the alkoxides with the UV absorbers in the primer composition of the present invention, the abrasion resistant coating composition preferably comprises UV absorbers which have reacted with reactive sites in the composition as described in U.S. application Ser. No. 07/276,276 filed on even date herewith by Lin et al entitled "UV Resistant, Abrasion Resistant Coatings", the disclosure of which is incorporated herein by reference.

The pH and/or degree of condensation of the alkoxides may be adjusted, if necessary, to prevent haze or precipitation upon mixing with the organic ultraviolet absorber, preferably ethoxylated or propoxylated hydroxybenzotriazoles, and to facilitate the condensation reaction of the terminal hydroxy groups on the extended unit of the organic UV absorber and the partially hydrolyzed metal alkoxide. The sol preferably comprises about 0.5 to 5.0 percent by solid weight of the hydrophilic hydroxybenzotriazole. Alkoxides of titanium and/or zirconium may also be included in compositions of the present invention, as well as colloidal silica for abrasion resistance.

The present invention will be further understood from the description of specific examples which follow.

EXAMPLE I

A thermoplastic acrylic primer is prepared by dissolving 12 grams of polymethyl methacrylate and 3 grams of polyethyl methacrylate in 230 grams of propylene glycol methyl ether (Dowanol PM from Dow Chemical Co.) and 20 grams of toluene. Two grams of Cyasorb 5411 UV absorber are added to provide the UV protection. A flow control agent is added (0.01 percent by weight of BYK-300 in a siloxane-containing polyether from BYK-Chemie Co. of West Germany).

Cleaned polycarbonate substrates are dipped for 2 minutes or flow-coated with the above primer solution, then allowed to air dry for about 15 minutes until tack-free. The primed plastics are dried for 30 minutes at 60° to 100° C. in an oven.

An abrasion resistant sol-gel coating is prepared comprising 100 grams of methyltriethoxysilane (A-162 from Union Carbide), 10 grams of dimethyldiethoxysilane, 60 grams of silica sol (Ludox LS from du Pont), and 3.6 grams of acetic acid. The mixture is allowed to react at room temperature for 1 day, diluted with 80 grams of isobutanol, then centrifuged. Two fractions of the mixture are taken, and to each respectively is added 0 and 1.5%, based on the gel weight, of β-(3-(2H-benzotriazole-2-yl-) 4-hydroxy-5-t-butylphenyl-) propionic acid, methyl ester of polyethylene glycol of molecular weight of 300. The reaction continues at room temperature for 3 days. The primed polycarbonate is dipped in the above solution for 3 minutes at 15° C., air dried for 15 minutes, then cured for 1 hour at 120° C.

The UV resistance is determined by the intensity of UV absorption through a quartz substrate. The adhesion property of the coating is determined, per ASTM D-3359-87, by using a Gardner 11-tooth scriber to cross-scribe in X-direction, then tape is pulled three times over the 100 squares. Adhesion is called excellent when no square is missing.

The UV resistance of the coating itself as well as its ability to protect an underlying substrate from damage by UV is evaluated by submitting the coated polycarbonates to an accelerated Q-UV chamber equipped with fluorescent tubes (B313 nanometers) manufactured by Q-panel Corporation according to the testing method described in ASTM G53-77. The chamber is programmed for an 8 hour light cycle at 70° C., followed by a 4 hour, 100% condensing cycle at 50° C. The appearance of the coating is inspected, and the discoloration reported in terms of the yellowness index (per ASTM E308-85, 1931 CIE, Illuminant C) using a UV/VIS spectrophotometer. Uncoated polycarbonate typically reaches a value of 10 soon after 100 hours of exposure.

The ultraviolet resistance of the primer alone, the primer and abrasion resistant coating together, and the primer and abrasion resistant coating which contains additional UV absorber are compared in the following table.

| Coating | UV Absorbence 292 nm | 335 nm | Adherence to Polycarbonate | 200 hours Q-UVB test |
|---|---|---|---|---|
| Primer only | 1.0 | 1.1 | excellent | passed |
| Primer + AR coating | 0.40 | 0.43 | fair | cracked |
| Primer + AR coating + UVA | 0.95 | 0.92 | excellent | passed |

EXAMPLE II

A primer solution of 90 parts polymethyl methacrylate and 10 parts polyethyl methacrylate is made by dissolving 24.3 grams of polymethyl methacrylate and 2.7 grams of polyethyl methacrylate in a warm mixture of 410 grams of Dowanol PM and 133 grams of diacetone alcohol. Added to the above is a solution comprising 6.7 grams of Tinuvin 900 UV absorber in 32 grams of toluene. To obtain an optically smooth surface, 0.05 grams of BYK-300, a siloxane-containing polyether is added as a flow control agent.

An abrasion resistant coating mixture is prepared by mixing 1.8 grams of polyvinylpyrrolidone (PVP K90 from GAF) in 33 grams of deionized water and 3.3 grams of methanol with a mixture of 48 grams of methyl trimethoxysilane, 4.8 grams of dimethyl diethoxysilane and 2.4 grams of acetic acid. After 2 hours at room temperature, the reaction mixture is diluted with 30 grams of 2-propanol and 15 grams of diacetone alcohol. Then 0.2 grams of sodium acetate is added to continue the reaction for 2 days. After adding 0.10 gram of BYK-300 flow control agent, the mixture is adjusted in pH by ion exchanging with 1.8 grams of BioRad Cation Exchange Resin (A6, 50W-X8).

Clean polycarbonate substrates are flow-coated with the primer solution. After about 15 minutes of air drying, the primer is further dried for 30 minutes at 100° C. The abrasion resistant coating mixture is flow-coated over the primed polycarbonate, dried in air for 15 minutes, then cured for 20 minutes at 120° C. An optically clear coating is obtained.

ASTM F735-81 is used to determine the Bayer abrasion resistance of the coating. A 4"×4" coated polycarbonate is subjected to an oscillating silica sand box for 300 cycles of abrasion in 2 minutes. The change in the percentage of haze which is measured by a hazemeter (Hazegard system of Pacific Scientific) is reported. Typically, uncoated polycarbonate has a 55-60% haze increase in this test.

The abrasion resistance, UV resistance and moisture-resistance properties are shown in Table 1.

EXAMPLE III

The polymethyl methacrylate/polyethyl methacrylate blend of Example II is replaced with 27 grams of a copolymer of methyl methacrylate and ethyl methacrylate at a 60/40 ratio (from Polyscience). The abrasion resistance, UV resistance and moisture resistance are shown along with the properties of Example II in the following table.

TABLE 1

| Primer | 300 Cycles Bayer Abrasion Test | 1200 Hrs Humidity | 300 Hrs Q-UVB Test | | |
|---|---|---|---|---|---|
| | | | % T | YID | Adhesion |
| Example II | 13.0 | 0.5% Haze | 89.5 | 1.4 | Excellent |
| Example III | 14.5 | 6.5% Haze | 88.5 | 1.6 | Excellent |

EXAMPLE IV

A primer is prepared by dissolving 5.0 grams of copolymer of methyl methacrylate and ethyl methacrylate (from Polyscience) in a warm mixture of 65 grams of propylene glycol methyl ether and 20 grams of diacetone alcohol. A UV absorber solution comprising 0.325 gram of Tinuvin 900 and 0.68 gram of Tinuvin 1130 in 5 grams of toluene is added. A flow control agent (0.01% of BYK-300) is added to control the flow characteristics of the coating. The primer forms about a 2 μm optically clear protective layer over polycarbonate. Results are shown in Table 2.

EXAMPLE V

A primer solution comprising 3.45 grams of homopolymer of methyl methacrylate and 0.44 gram of homopolymer of ethyl methacrylate is prepared. The blend is solubilized in 54.2 grams of propylene glycol methyl ether and 17.6 grams of diacetone alcohol. The UV absorber solution consists of 0.75 gram of Tinuvin 1130 and 0.41 gram of Tinuvin 900 in 7.5 grams of toluene. Results are shown in Table 2.

EXAMPLE VI

For comparison, a primer solution using a homopolymer of polyethyl methacrylate is prepared by dissolving 4.29 grams of polyethyl methacrylate in a warm solvent mixture of 56 grams of Dowanol PM and 17.1 grams of diacetone alcohol. A solution containing 0.5 gram of Tinuvin 1130 and 0.3 gram of Tinuvin 900 in 2.5 grams of toluene is prepared.

A silane-PVP type abrasion resistant coating is prepared as described in Examples II and III. The primer is flow-coated onto polycarbonate, and then dried for 30 minutes at 100° C. The abrasion resistant film is also flow-coated, and is cured for 20 minutes at 120° C. The moisture resistance of the primer coating, which reflects the organic acrylic matrix and UV absorber compatibility, and the overall moisture resistance is shown in the following table of results from a 150° F., 100% condensing humidity test.

TABLE 2

| Primer | AR Coating | 48 Hours Humidity Test | |
|---|---|---|---|
| | | % Haze | Appearance |
| Example IV | Without | 1.90 | Excellent |
| Example IV + | With | 1.20 | Excellent |
| Example V | Without | 0.80 | Excellent |
| Example V + | With | 1.30 | Excellent |
| Example VI | Without | 23.0 | Milky, Edge debonding |
| Example VI + | With | 21.0 | Milky, Edge debonding |

EXAMPLE VII

A silane-alumina type abrasion resistant coating is prepared which comprises the following ingredients: 62 grams of 5% alumina sol in water, 75 grams of methyltriethoxysilane, 5 grams of dimethyl diethoxysilane, 2 grams of acetic acid, 18 grams of diacetone alcohol and 18 grams of 2-propanol.

Clean polycarbonate is primer coated with the solution prepared in Example V and dried for 30 minute at 100° C. The above silane-alumina solution is flow-coated, over the primed polycarbonate surface, air dried for 15 minutes, and then cured for 2 hours at 120° C. The coated polycarbonate shows excellent abrasion resistance, 8.0 percent haze after 300 cycles of Bayer abrasion testing, and yellowness of only 3.0 YID after 700 hours of Q-UVB exposure. No haze on the coating develops after 1200 hours of humidity exposure at 150° F. at 100 percent relative humidity.

The above examples are offered to illustrate the present invention. Various organic polymers and organic UV absorbers may be combined in a wide range of proportions and concentrations, with a variety of aggressive solvents such as aromatic solvents such as xylene which enhance adherence to organic substrates. These coatings are useful on a variety of substrates and with a variety of abrasion resistant coatings in accordance with the present invention, the scope of which is defined by the following claims.

We claim:

1. An optically transparent, ultraviolet radiation resistant coated article comprising:
   a. an optically transparent rigid polycarbonate substrate; and
   b. a transparent ultraviolet radiation resistant coating comprising:
      (1) an organic compound which absorbs ultraviolet radiation; and
      (2) a film-forming polymer comprising a mixture of alkyl acrylates and having a glass transition temperature between 65° C. and 105° C.

2. An article according to claim 1, wherein the substrate is polycarbonate.

3. An article according to claim 2, wherein said coating comprises a hydroxy-containing organic compound which absorbs ultraviolet radiation.

4. An article according to claim 3, wherein said organic compound is selected from the group consisting of hydroxybenzophenone and hydroxybenzotriazole.

5. An article according to claim 4, wherein said film-forming polymer comprises poly(methyl methacrylate).

6. An article according to claim 5, wherein said polymer further comprises poly(ethyl methacrylate).

7. An article according to claim 6, wherein said polymer comprises 60 to 90 percent by weight poly(methyl methacrylate).

8. An article according to claim 1, further comprising an abrasion resistant coating which is the reaction product of the hydrolytic polycondensation of a metal alkoxide.

9. An article according to claim 8, wherein said abrasion resistant coating comprises a compound which absorbs ultraviolet radiation.

10. An article according to claim 9, wherein said compound is a hydroxy-containing organic compound.

* * * * *